(12) United States Patent
Bayerl et al.

(10) Patent No.: US 8,130,810 B2
(45) Date of Patent: Mar. 6, 2012

(54) LASERS

(75) Inventors: Wilhelm Bayerl, Deisenhof (DE); Jim Fieret, Shenington (GB)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 12/763,267

(22) Filed: Apr. 20, 2010

(65) Prior Publication Data

US 2010/0265984 A1 Oct. 21, 2010

(30) Foreign Application Priority Data

Apr. 21, 2009 (GB) .................................. 0906820.6

(51) Int. Cl.
*H01S 3/22* (2006.01)
*H01S 3/223* (2006.01)
(52) U.S. Cl. ................ 372/59; 372/55; 372/58
(58) Field of Classification Search ............ 372/55, 372/57, 58, 60, 59
See application file for complete search history.

(56) References Cited

U.S. PATENT DOCUMENTS

| 3,789,320 A | * | 1/1974 | Hepburn | 372/58 |
| 4,316,157 A | * | 2/1982 | Dosi et al. | 372/59 |
| 4,674,099 A | * | 6/1987 | Turner | 372/59 |
| 2006/0107831 A1 | * | 5/2006 | Karwacki et al. | 95/116 |

FOREIGN PATENT DOCUMENTS

| JP | 60180185 A | 2/1984 |
| WO | WO 2006/067384 A1 | 6/2006 |

* cited by examiner

*Primary Examiner* — Armando Rodriguez
(74) *Attorney, Agent, or Firm* — Philip H. Von Neida

(57) ABSTRACT

A laser apparatus comprises a laser having a lasing chamber an inlet to the lasing chamber for a lasing gas containing a heavy noble gas and an outlet from the lasing chamber for the discharge of a flow of lasing gas, wherein the outlet is able to be paced in communication with the atmospheric through an adsorptive trap containing a selective adsorbent of the heavy noble gas.

In operation, the heavy noble gas (xenon or krypton) is adsorbed in the trap. The trap may be taken to a remote site for the recovery of the heavy noble gas when it is approaching saturation.

15 Claims, 2 Drawing Sheets

LASERS

BACKGROUND OF THE INVENTION

This invention relates to a method operating of a laser and to a laser apparatus.

There are different kinds of gas laser that employ a heavy noble gas, that is one or both of xenon and krypton, as a component of the lasing gas. In particular, carbon dioxide lasers use a premixed lasing gas, which is a mixture of carbon dioxide, a heavy noble gas, and one or more of helium, nitrogen, oxygen and carbon monoxide. The typical xenon content is between 1 and 3% by volume.

The lasing gas is fed into the lasing chamber of the laser as a continuous steam or intermittently, while the laser is continuously or periodically exhausted, typically by means of a vacuum pump. In this way the lasing chamber is continuously purged so as to ensure optimal operation. The waste gas, including xenon, is released into the atmosphere and therefore lost.

It is known to recover and recycle a noble gas from a gas mixture. Typically, pressure swing adsorption processes are used for this purpose. Examples are given in WO2005/03116 A and WO2006/067384 A. Such methods have drawbacks if used with lasers.

SUMMARY OF THE INVENTION

According to the present invention there is provided a method of operating a gas laser including the steps of passing a lasing gas containing heavy noble gas into a lasing chamber of the gas laser, discharging a flow of the lasing gas from the lasing chamber, passing the discharged flow through an adsorptive trap containing a selected adsorbent of the heavy noble gas, adsorbing the heavy noble gas on the selective adsorbent to form a gas flow depleted of heavy noble gas, and discharging to the atmosphere the gas flow depleted of the heavy noble gas.

The invention also provides a laser apparatus comprising a laser having a laser chamber, an inlet to the lasing chamber for a lasing gas containing a heavy noble gas, and an outlet from the lasing chamber for the discharge of a flow of the lasing gas, wherein the outlet is able to be placed in communication with the atmosphere through an adsorptive trap containing a selective adsorbent of the heavy noble gas.

It is to be understood that the trap is independent of any gas separation unit or plant for recovering heavy noble gas. The trap is therefore so connected to the apparatus as to permit its ready removal for recovery off-site of the adsorbed heavy noble gas.

Typically, in the method according to the invention, a volume of the lasing gas is established in the lasing chamber and the volume is continuously topped up with fresh lasing gas containing heavy noble gas.

Typically, the flow of lasing gas is continuously discharged from the lasing chamber. In typical operation of the laser, there is also operated a vacuum pump so as to maintain the pressure in the lasing chamber below atmospheric pressure. The flow of lasing gas is typically discharged from the laser chamber through the vacuum pump. Accordingly, the vacuum pump has an inlet communicating with the said outlet from the lasing chamber and an outlet communicating with an inlet to the trap.

The adsorption of the heavy noble gas preferably takes place at elevated pressure, for example, a pressure of at least 1 bar (a). Elevation of the pressure enhances the adsorptive capacity of the trap.

The adsorption pressure is typically the outlet pressure of the vacuum pump. Alternatively, the adsorption pressure can be greater than the outlet pressure of the vacuum pump. In this case, the vacuum pump may feed a compressor which in turn discharges the spent lasing gas to the trap.

When the adsorptive trap is approaching saturation it may be removed and replaced with a fresh one. The adsorbed heavy noble gas can be recovered from the removed trap at a site remote from the gas laser. Preferably, the size of the trap is such that it does not need to be replaced more frequently than the source of the lasing gas, if such source is a cylinder of pressurised gas.

The trap may be protected by one or more oil filters from oil vapour emanating from a vacuum pump and/or compressor in the gas extraction line.

A number of different adsorbents are capable of selectively adsorbing xenon or krypton from a mixture of the xenon or krypton with one or more other gases. Activated carbon is particularly suitable. The activated carbon may have a simple particulate form or it may be formed into a body or bodies of chosen dimensions.

The trap preferably comprises a pressure vessel containing the selective adsorbent.

The adsorbent is typically regenerated by subjecting the trap to an elevated temperature, for example, a temperature of 200° C. so as to drive off the adsorbed gas. This operation is preferably performed at a remote heavy noble gas purification plant. Such plants are well known. The trap therefore is preferably able to withstand a temperature of 200° C. If the trap takes the form of a typical cylindrical gas cylinder it will fulfill the requirement of being able to withstand a temperature of 200° C.

The method and apparatus according to the invention are suitable for use in conjunction with any known kind of gas laser that employs a lasing gas. The method and apparatus according to the invention are particularly useful with carbon dioxide gas lasers. Some kinds of carbon dioxide gas laser operate with a carbon dioxide-based lasing gas that excludes heavy noble gas. It is known that the inclusion of, typically, up to 5% by volume of heavy noble gas would improve the efficiency of such a laser. However, the rate of throughput of the lasing gas is such as to have previously made the inclusion of a heavy noble gas in the lasing gas uneconomic. The method and apparatus according to the invention help to reduce the economic disadvantage of employing heavy noble gas in such a situation. The gas laser may alternatively be an excimer laser. In an excimer laser a transient species such as a halide of xenon or krypton, for example, xenon fluoride is formed. Noble gas is therefore discharged from the lasing chamber.

If desired, the lasing gas includes in addition to the heavy noble gas, carbon dioxide and at least one of helium, nitrogen, oxygen and carbon monoxide. Such a gas mixture may be premixed and provided in premixed form in a gas cylinder.

The heavy noble gas may be xenon, krypton or a mixture of xenon and krypton.

BRIEF DESCRIPTION OF THE DRAWINGS

The method according to the present invention will now be described by way of example with reference to the accompanying drawings, in which.

The drawings are not to scale.

DETAILED DESCRIPTION OF THE INVENTION

Figure 1:
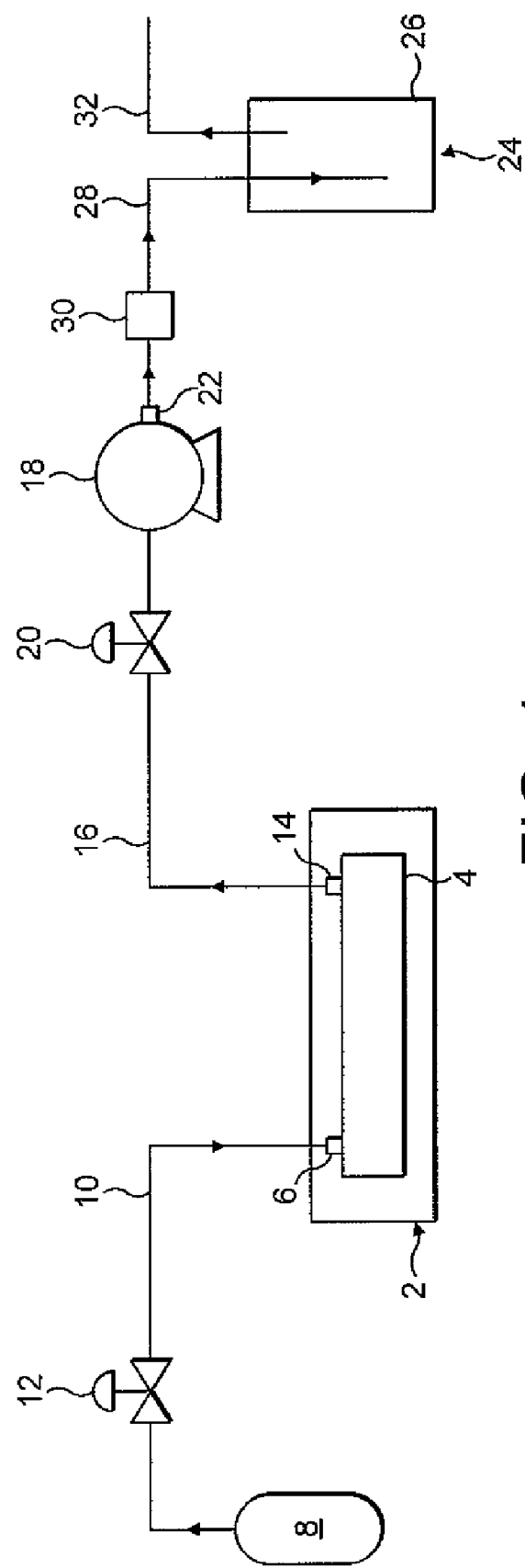
FIG. 1 is a schematic flow diagram of a laser apparatus according to the invention.

Referring to FIG. 1 of the drawings, a gas laser 2, typically a carbon dioxide laser used for cutting or welding in industry, has a lasing chamber 4. The configuration and operation of such lasers are well known in the art and need not be described in detail herein. The lasing chamber 4 has an inlet 6 for lasing gas.

The lasing gas may be provided from a preformed mixture stored under pressure in a gas cylinder 8. A conduit 10 places the gas cylinder 8 in communication with the inlet 6. The conduit 10 may be provided with a flow control valve 12 and various safety and shut-off valves (not shown) of a kind well known in the art.

The lasing gas mixture typically contains up to 10% by volume of heavy noble gas, usually xenon, but alternatively krypton or a mixture of xenon and krypton.

The lasing chamber 4 has an outlet 14 for the discharge of the lasing gas. A continuous flow of gas through the lasing chamber 4 helps to guard against the accumulation of undesirable impurities within the lasing chamber 4. The outlet 14 communicates via a conduit 16 with a vacuum pump 18. The conduit 16 may have located therein a flow control valve 20 and various safety and stop valves (not shown) of a kind well known in the art.

Typically, the lasing chamber 4 may be filled with lasing gas and once an initial volume of lasing gas has been established therein, the valves 12 and 20 may be set so as to maintain a constant flow into and out of the lasing chamber 4. The vacuum pump 18 is operated so as to establish a chosen sub-atmospheric pressure within the lasing chamber 4. The vacuum pump has an outlet 22. Conventional vacuum pumps are such that there will be a superatmospheric pressure, typically in the order of 3 bar, at the outlet 22. An adsorptive trap 24 containing a selective carbonaceous adsorbent 26 is connected to the outlet 22 of the vacuum pump 18 by a conduit 28. The conduit 28 preferably has an oil filter 30 disposed therein. The oil filter 30 is effective to remove any oil vapour, or indeed droplets of oil, which leave the vacuum pump 18 with the spent lasing gas.

The adsorbent is preferably a particulate activated carbon.

The pressurised, exhausted lasing gas passes through the trap 26. The heavy noble gas is selectively adsorbed therefrom. Unadsorbed gas is discharged to the atmosphere through an outlet 32 from the trap 24. The trap 24 may typically have a volume (in terms of water capacity) of approximately one liter. The heavy noble gas capacity of the trap 24 is therefore such as to enable the laser to be operated for a long period of time without the adsorbent in the trap becoming saturated with heavy noble gas.

When the adsorbent 26 is approaching saturation, the trap 24 may be removed and replaced with a new one. The trap 24 is thus connected to the apparatus in such a way to permit its easy removal and replacement.

The trap may take the form of a gas cylinder for storing gas under pressure. Replacement traps 24 may be delivered with cylinders of pressurised lasing gas, and the used traps may be returned to the cylinder depot for recovery of the adsorbed heavy noble gas. Such recovery may be affected by heating the adsorbent to 200° C. so as to discharge the heavy noble gas. The discharged heavy noble gas is sent to a conventional heavy noble gas purification unit at a cylinder filling station.

Figure 2:
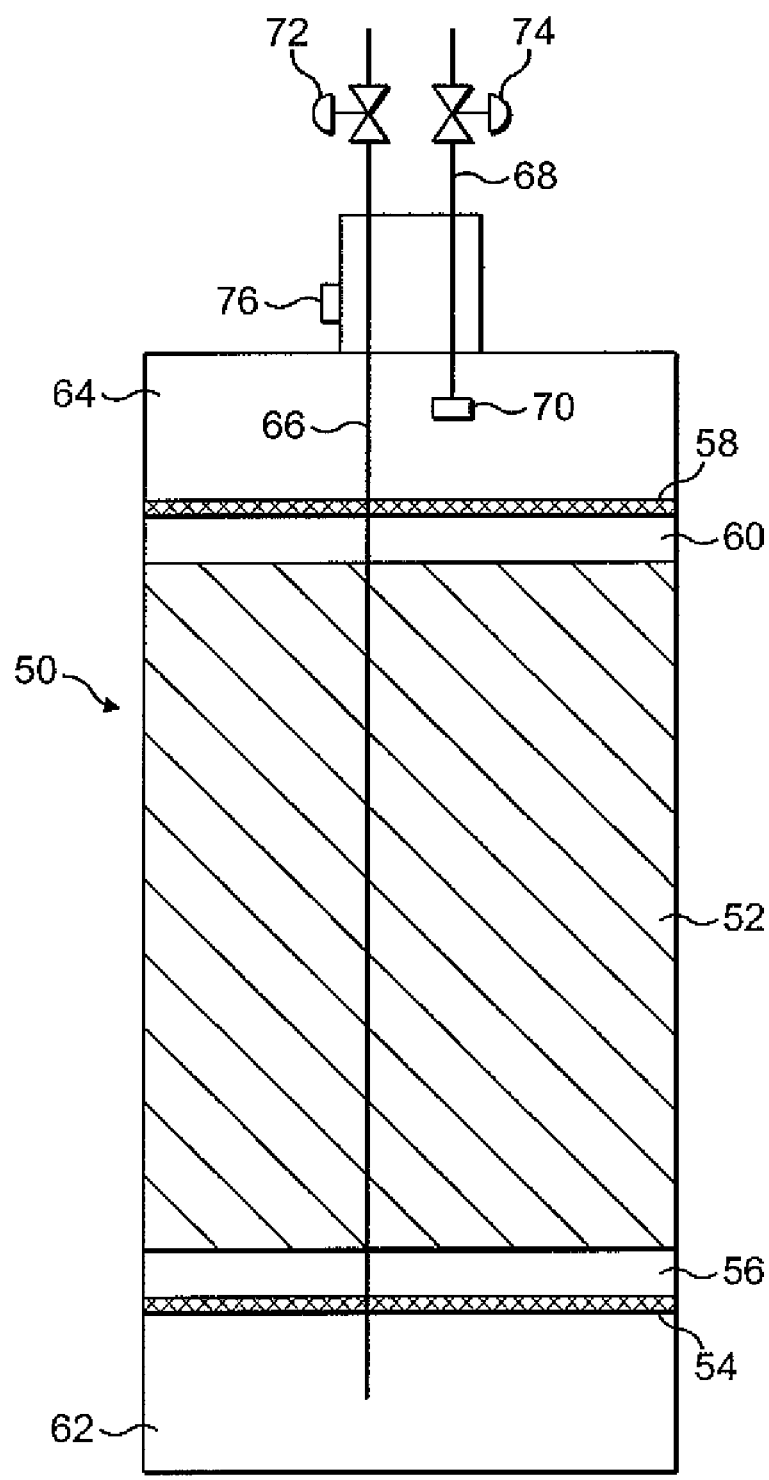
FIG. 2 is a schematic representation of an adsorptive trap for use in the apparatus shown in FIG. 1.

One configuration of heavy noble gas trap is shown in FIG. 2. The trap comprises a cylinder or vessel 50 of a kind suitable for storing gas under pressure. The cylinder 50 contains a charge or bed 52 of activated carbon adsorbent. The bed 52 is supported on a grid 54. A suitable layer 56 of retaining and gas distribution material, for example, glass beads, is interposed between the grid 54 and the bed 52 of activated carbon. A similar grid 58 and layer 60 of glass beads may be located on top of the bed 52 of activated carbon. Gas spaces 62 and 64 are provided respectively below and above the bed 52 of activated carbon. Exhausted lasing gas is supplied to the cylinder 50 through a dip tube 66 which terminates in the lower gas space 62 and extends downwardly through bed 52 of activated carbon. Gas is discharged from the trap through an outlet pipe 68. The outlet pipe 68 terminates at its bottom in the upper gas space 64 and is provided with a filter 70 to prevent the carry over of any particles of activated carbon. In operation, exhausted lasing gas is conveyed through the dip tube 66 to the gas space 62 beneath the bottom of the bed 52. The gas flows upwardly through the bed and as it does so heavy noble gas is adsorbed therefrom. The unadsorbed gas is discharged to the atmosphere from the outlet pipe 68. The cylinder 50 is provided with a manually operable inlet valve 72 and a manually operable outlet valve 74. Typically, the valves 72 and 74 are incorporated into a single unit which is received in the mouth of the vessel 50 and acts as the closure therefor.

The vessel may also at its mouth be provided with a bursting disc 76 set to fail a pressure of, say, 30 bar.

In normal of the operation of the trap, the valves 72 and 74 are in open positions. When it is desired to shut down the apparatus or remove the trap, the valves 72 and 74 are closed and the trap decoupled from the rest of the apparatus.

What we claim is:

1. A method of operating a carbon dioxide gas laser comprising the steps of passing a lasing gas containing heavy noble gas, carbon dioxide and at least one gas selected from the group consisting of helium, nitrogen, oxygen and carbon monoxide into a lasing chamber of the gas laser, discharging a flow of the lasing gas from the lasing chamber, passing the discharged flow through an adsorptive trap containing activated carbon of the heavy noble gas, adsorbing the heavy noble gas on the activated carbon to form a gas flow depleted of heavy noble gas, and discharging to the atmosphere the gas flow depleted of the heavy noble gas.

2. The method according to claim 1, wherein a volume of the lasing gas is established in the lasing chamber and the volume is continuously topped up with fresh lasing gas containing heavy noble gas.

3. The method according to claim 1 wherein the flow of lasing gas is continuously topped up with fresh lasing gas containing heavy noble gas.

4. The method according to claim 1, additionally including the step of operating a vacuum pump so as to maintain the pressure in the lasing chamber below atmospheric pressure.

5. The method according to claim 4, wherein the flow of lasing gas is discharged from the laser chamber through the vacuum pump.

6. The method according to claim 1, wherein the adsorption of the heavy noble gas takes place at a pressure of at least 1 bar (a).

7. The method according to claim 1 comprising periodically removing the adsorptive trap, and recovering the adsorbed heavy noble gas at a site remote from the gas laser.

8. The method according to claim 1, wherein the heavy noble gas is xenon, krypton or a mixture of xenon or krypton.

9. The method according to claim 1, wherein the lasing gas contains up to 10% by volume of one or both of xenon and krypton.

10. A laser apparatus comprising a carbon dioxide gas laser having a lasing chamber an inlet to the lasing chamber for a lasing gas containing a heavy noble gas and an outlet from the lasing chamber for the discharge of a flow of lasing gas, wherein the outlet is able to be placed in communication with the atmospheric through an adsorptive trap containing a selective adsorbent of the heavy noble gas.

11. The laser apparatus according to claim 10, additionally including a vacuum pump having an inlet communicating with the said outlet from the lasing chamber and an outlet communicating through a conduit with the trap.

12. The laser apparatus according to claim 10, wherein the trap comprises a pressure vessel containing the selective adsorbent.

13. The laser apparatus according to claim 10, wherein the trap is connected to the apparatus as to permit its ready removal for recovery off-site of the adsorbed heavy noble gas.

14. The laser apparatus according to claim 10, wherein the trap is capable of withstanding a temperature of 200° C. or other elevated temperature that is used to assist in the purging of the trap.

15. The laser apparatus according to claims 10, wherein the trap is protected by an oil filter.

* * * * *